(12) United States Patent
Shabtay et al.

(10) Patent No.: US 8,347,877 B2
(45) Date of Patent: Jan. 8, 2013

(54) SOLAR ENERGY COLLECTING SYSTEM AND METHOD

(75) Inventors: Yoram Leon Shabtay, Prospect Heights, IL (US); William E. Panthofer, Jackson, TN (US)

(73) Assignee: Mill Masters, Inc., Jackson, TN (US)

( * ) Notice: Subject to any disclaimer, the term of this patent is extended or adjusted under 35 U.S.C. 154(b) by 268 days.

(21) Appl. No.: 12/708,092

(22) Filed: Feb. 18, 2010

(65) Prior Publication Data
US 2010/0206300 A1    Aug. 19, 2010

Related U.S. Application Data

(60) Provisional application No. 61/153,748, filed on Feb. 19, 2009.

(51) Int. Cl.
*F24J 2/24* (2006.01)

(52) U.S. Cl. ........ 126/664; 126/600; 126/651; 126/663; 126/665; 126/666; 126/667; 126/668; 126/669; 126/704

(58) Field of Classification Search .................. 126/600, 126/651, 663, 664, 665, 666, 667, 668, 669, 126/704
See application file for complete search history.

(56) References Cited

U.S. PATENT DOCUMENTS

| | | | | |
|---|---|---|---|---|
| 2,857,634 A | * | 10/1958 | Garbade et al. | 49/77.1 |
| 3,012,294 A | * | 12/1961 | Waldor | 52/207 |
| 3,048,375 A | * | 8/1962 | Walker | 165/49 |
| 3,168,782 A | * | 2/1965 | Cochran | 228/181 |
| 3,239,000 A | * | 3/1966 | Meagher | 165/46 |
| 3,321,012 A | * | 5/1967 | Hervey | 165/300 |
| 4,014,313 A | * | 3/1977 | Pedersen | 126/660 |
| 4,033,325 A | * | 7/1977 | Walker | 126/638 |
| 4,067,319 A | * | 1/1978 | Wasserman | 126/634 |
| 4,072,262 A | * | 2/1978 | Godrick et al. | 228/265 |
| 4,073,282 A | * | 2/1978 | Schriefer, Jr. | 126/648 |
| 4,083,358 A | * | 4/1978 | Scott | 126/663 |
| 4,098,259 A | * | 7/1978 | Barber et al. | 126/661 |
| RE29,737 E | * | 8/1978 | Bottum | 126/661 |
| 4,103,675 A | * | 8/1978 | Bar-On et al. | 126/667 |
| 4,112,922 A | * | 9/1978 | Skinner et al. | 126/664 |
| 4,117,831 A | * | 10/1978 | Bansal et al. | 126/664 |

(Continued)

FOREIGN PATENT DOCUMENTS

CA    2073754    1/1993

(Continued)

*Primary Examiner* — Kenneth Rinehart
*Assistant Examiner* — Jorge Pereiro
(74) *Attorney, Agent, or Firm* — Hartman Global IP Law; GAry M. Hartman; Domenica N. S. Hartman (57) ABSTRACT

A solar energy collecting system and method suitable for hot water generation using solar energy. The system includes multiport tubes between inlet and outlet manifolds. The tubes are formed of a metallic material, each tube has oppositely-disposed first and second flat surfaces between lateral edges thereof, longitudinally-opposed first and second ends, and multiple fluid channels between the first and second ends that are in fluidic parallel to each other. The inlet and outlet manifolds are coupled to the first and second ends of the tubes so that chambers within the inlet and outlet manifolds are fluidically connected to the fluid channels of the multiport tubes. During operation of the system, a fluid flowing through the fluid channels of the tubes is heated by direct solar radiation impinging the first flat surfaces of the tubes and optionally by reflected solar radiation impinging the second flat surfaces of the tubes.

28 Claims, 10 Drawing Sheets

U.S. PATENT DOCUMENTS

| | | | |
|---|---|---|---|
| 4,144,931 A * | 3/1979 | Medico, Jr. | 165/48.2 |
| 4,191,165 A | 3/1980 | Faudarole | |
| 4,219,008 A * | 8/1980 | Schultz | 126/592 |
| 4,222,373 A * | 9/1980 | Davis | 126/664 |
| 4,231,508 A * | 11/1980 | Wagner | 228/219 |
| 4,278,076 A * | 7/1981 | Hopper | 126/704 |
| 4,292,958 A * | 10/1981 | Lee | 126/664 |
| 4,297,991 A * | 11/1981 | Easton | 126/664 |
| 4,303,059 A * | 12/1981 | Ford | 126/655 |
| 4,340,034 A * | 7/1982 | Hopper | 126/659 |
| 4,426,999 A | 1/1984 | Evans et al. | |
| 4,527,548 A * | 7/1985 | Gustafson | 126/607 |
| 4,579,107 A * | 4/1986 | Deakin | 126/654 |
| 4,832,119 A * | 5/1989 | Bloor et al. | 165/171 |
| 5,172,847 A * | 12/1992 | Barten et al. | 228/18 |
| 5,373,838 A * | 12/1994 | Ho | 126/569 |
| 5,469,915 A * | 11/1995 | Cesaroni | 165/171 |
| 5,531,215 A | 7/1996 | Schwarz | |
| 6,024,086 A * | 2/2000 | Rich | 126/664 |
| 6,134,842 A * | 10/2000 | Cheng et al. | 52/1 |
| 6,302,197 B1 * | 10/2001 | Hornby et al. | 165/173 |
| 6,499,255 B1 * | 12/2002 | Givoni | 49/82.1 |
| 6,978,578 B2 * | 12/2005 | Givoni | 52/173.3 |
| 7,325,542 B2 * | 2/2008 | Mejia | 126/605 |
| 7,472,744 B2 * | 1/2009 | Gorbounov et al. | 165/178 |
| 7,677,242 B2 * | 3/2010 | Carcangiu et al. | 126/600 |
| 7,810,491 B2 * | 10/2010 | Benvenuti | 126/653 |
| 2002/0002972 A1 * | 1/2002 | Blake et al. | 126/692 |
| 2003/0037907 A1 * | 2/2003 | Lee | 165/104.19 |
| 2007/0039611 A1 * | 2/2007 | Benvenuti | 126/652 |
| 2008/0210293 A1 * | 9/2008 | Reid et al. | 136/251 |
| 2009/0025709 A1 | 1/2009 | Bogdan et al. | |
| 2010/0051016 A1 * | 3/2010 | Ammar | 126/600 |

FOREIGN PATENT DOCUMENTS

| | | |
|---|---|---|
| EP | 113325 A2 * | 7/1984 |
| WO | WO8912205 | 12/1989 |

\* cited by examiner

SOLAR ENERGY COLLECTING SYSTEM AND METHOD

CROSS REFERENCE TO RELATED APPLICATIONS

This application claims the benefit of U.S. Provisional Application No. 61/153,748, filed Feb. 19, 2009, the contents of which are incorporated herein by reference.

BACKGROUND OF THE INVENTION

The present invention generally relates to solar energy collecting systems and methods for their use and production. More particularly, this invention relates to solar panels whose construction includes lightweight flat multi-channel tubes, and to solar energy collecting systems that mainly comprise the solar panels and a water tank. The solar panel is capable of achieving improved efficiency so that less collector area will be required to be installed or, for a given collector area, more hot water will be produced.

Existing solar energy thermal collectors are generally available in three forms: formed plastic collectors, flat plate collectors, and evacuated tube collectors. Plastic collectors generally employ polymeric multi-channel tubes or panels directly exposed to the sun for heating a fluid (for example, water) flowing through the channels. Flat plate collectors have typically employed an absorber plate contacted by round copper tubing which are encased together in an insulated enclosure. The absorber plate may be in the form of flat fins between the round tubes. The absorber plate is heated by the sun, and the absorbed heat is conducted through the absorber plate, through the absorber-tube joints, and through the tube walls to a heating fluid flowing through the tubes. Evacuated tube collectors generally employ individual vacuum-sealed glass tubes, each containing a copper tube through which a heating fluid flows. The copper tube is typically contacted by an absorber fin or sheet within the glass tube, and the surrounding vacuum acts as an insulator to minimize heat losses from the copper tube to the environment outside of the glass tube and thereby enable the copper tube to reach higher temperatures.

The thermal collector technologies outlined above have a number of limitations. Liquid flow area within the tubes is small compared to the available absorption area of the absorber plates. Highest efficiencies are only achieved during midday for non-tracking panels. Costs are relatively high, especially for vacuum tubes. Copper tubing is relatively heavy. Polymeric tubes, while not susceptible to corrosion, are prone to distortion and UV degradation and are not capable of withstanding high temperatures. Vacuum tubes are fragile, expensive, and require large amounts of space, and the glass tubes limit the size of the absorber fin or sheet. Finally, the vacuum insulation method employed by vacuum tubes results in an array of tubes occupying a large space, with each glass vacuum tube containing a single copper round tube and a typical glass tube diameter of about 40 mm.

BRIEF DESCRIPTION OF THE INVENTION

The present invention provides a solar energy collecting system and method suitable for, but not limited to, hot water generation using solar energy in residential, commercial and other locations and in other uses where hot water is desired and solar energy is available.

According to a first aspect of the invention, the system includes a plurality of multiport tubes and a pair of inlet and outlet manifolds. The multiport tubes are formed of a metallic material, each multiport tube has oppositely-disposed first and second flat surfaces between lateral edges thereof that define a width dimension of the multiport tube, longitudinally-opposed first and second ends that define a length dimension of the multiport tube, and a plurality of fluid channels between the first and second ends that are in fluidic parallel to each other. The inlet and outlet manifolds are coupled to the first and second ends of the multiport tubes so that chambers within the inlet and outlet manifolds are fluidically connected to the fluid channels of the multiport tubes. During operation of the system, a fluid flows from the chamber of the inlet manifold and through the fluid channels of the multiport tubes to the chamber of the outlet manifold.

According to a preferred aspect of the invention, the system further includes an enclosure having an interior that contains the multiport tubes and the inlet and outlet manifolds. The enclosure comprising first and second panels and a frame assembly interconnecting the first and second panels together such that the first and second panels are substantially parallel to each other. The multiport tubes are oriented by the inlet and outlet manifolds so that their respective first flat surfaces are positionable to face the first panel and their respective second flat surfaces are positionable to face the second panel. The first panel is substantially transparent to solar radiation and the first flat surfaces of the multiport tubes are adjacent to the first panel so as to be heated by solar radiation that passes through the first panel into the interior of the enclosure. The second panel is substantially reflective to solar radiation and the second flat surfaces of the multiport tubes are adjacent to the second panel so as to be heated by solar radiation that passes through the first panel into the interior of the enclosure and is reflected by the second panel.

In view of the above, it can be appreciated that the present invention provides various benefits over conventional solar energy collectors. The metal multiport tubes can be formed by extrusion, for example, extruding an aluminum alloy, and consequently can be produced at lower cost than extruded polymeric materials, copper tubing and copper sheet materials commonly used in solar energy collectors. Notably, the flat surfaces of the multiport tubes enable the tubes to be directly used as solar collectors without the addition of absorber plates or fins. Extruded aluminum multiport tubes are widely used in the automotive industry in condensers and charge air coolers, and therefore should be more readily available than extruded polymeric and copper tubing and from a greater number of sources. Extruded aluminum multiport tubes also have the advantage of being capable of assembly with manifolds using commercially available brazing materials, equipment, and methods. For example, braze rings can be used and brazing performed with a braze torch. The brazing process can be automated, similar to high volume automotive heat exchanger production methods. For a given level of heating capacity, the solar energy collection system of this invention can also be manufactured to have a relative low weight, minimizing shipping costs and allowing the system to be carried to rooftops and other elevated locations where solar collectors are commonly installed.

Metallic multiport tubes are also capable of achieving long service lives, particularly in comparison to polymeric tubing that tends to degrade under UV exposure, has lower mechanical strength, and has lower maximum operating temperatures than aluminum alloys. Zinc-coated aluminum multiport tubes are particularly notable as having been proven to resist high temperatures and external corrosion in harsh automotive applications. Brazed aluminum multiport tubes also have a proven track record in the automotive industry for high reliability and leak-free braze joints, in contrast to polymeric tubing whose connections tend to develop leaks when exposed to varying conditions of thermal expansion and contraction. The multiport tubes employed by this invention also compare favorably to evacuated (vacuum) tube collectors, whose outer glass tubes are fragile and whose efficiency is dramatically decreased if they lose their hermetic seal. Furthermore, the multiport tubes of this invention are capable of absorbing diffused radiation, whereas evacuated tube collectors do not.

Other aspects of the invention include solar energy collection methods performed with the systems described above.

DETAILED DESCRIPTION OF THE INVENTION

Figure 1:
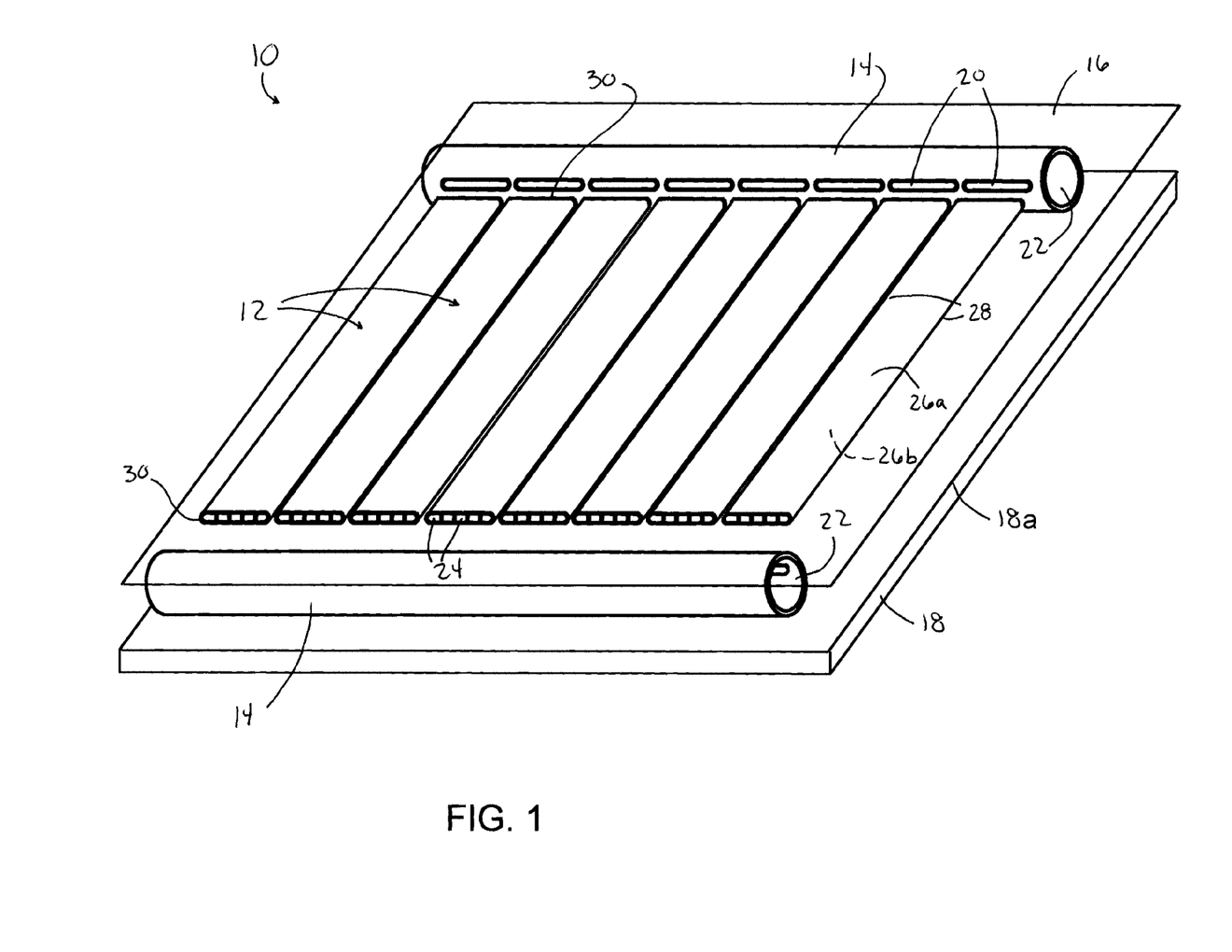
FIG. 1 is a perspective view representing a solar energy collection panel in accordance with an embodiment of this invention.

FIG. 1 schematically represents a solar energy collection apparatus, referred to below as a solar panel 10, according to an embodiment of the invention. The panel 10, which may be described as a solar collector or thermal collector, comprises multiple tubes 12 fluidically connected to a pair of manifolds 14, which form a fluid circuit between a pair of panels 16 and 18. The upper panel 16 (as oriented in FIG. 1) is above the tubes 12 and is preferably glazing or another material suitably transparent to solar radiation, whereas the lower panel 18 is beneath the tubes 12 and may be formed of various materials, including materials that have thermal insulating properties and/or reflective properties. For example, the lower panel 18 may have a reflective surface 18a as discussed below. The tubes 12 are represented as being aligned with slots 20 in the manifolds 14, into which the tubes 12 are inserted to create the fluid circuit that comprises the interior chambers 22 of the manifolds 14 and channels 24 within the tubes 12. As evident from FIG. 1, the tubes 23 are connected in fluidic parallel between the manifolds 14.

Figure 2:
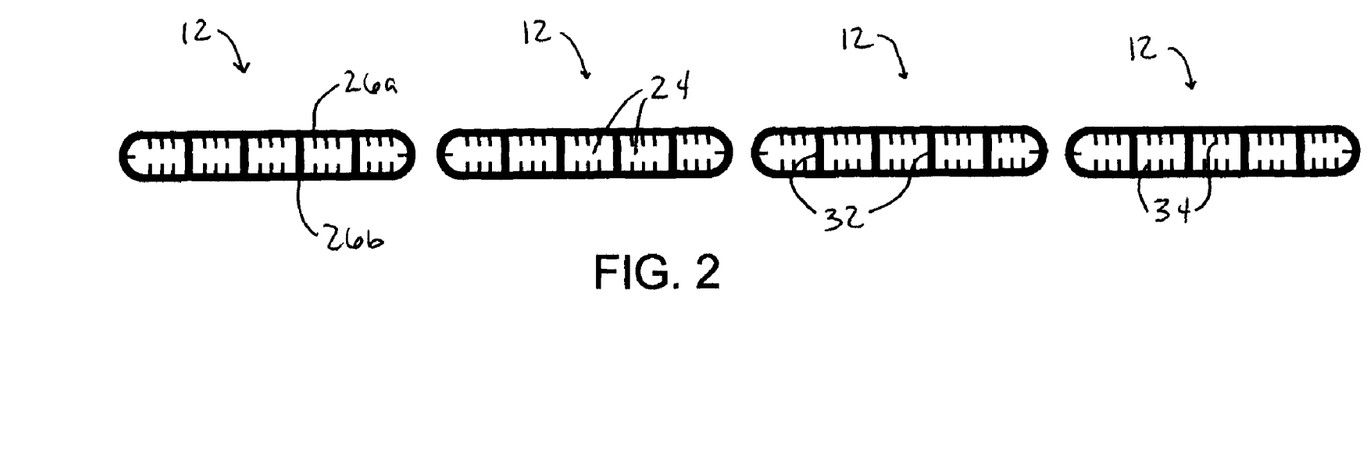
FIG. 2 schematically shows a cross-sectional view of multiport tubes of a solar energy collection panel similar to the panel of FIG. 1
Figure 3:
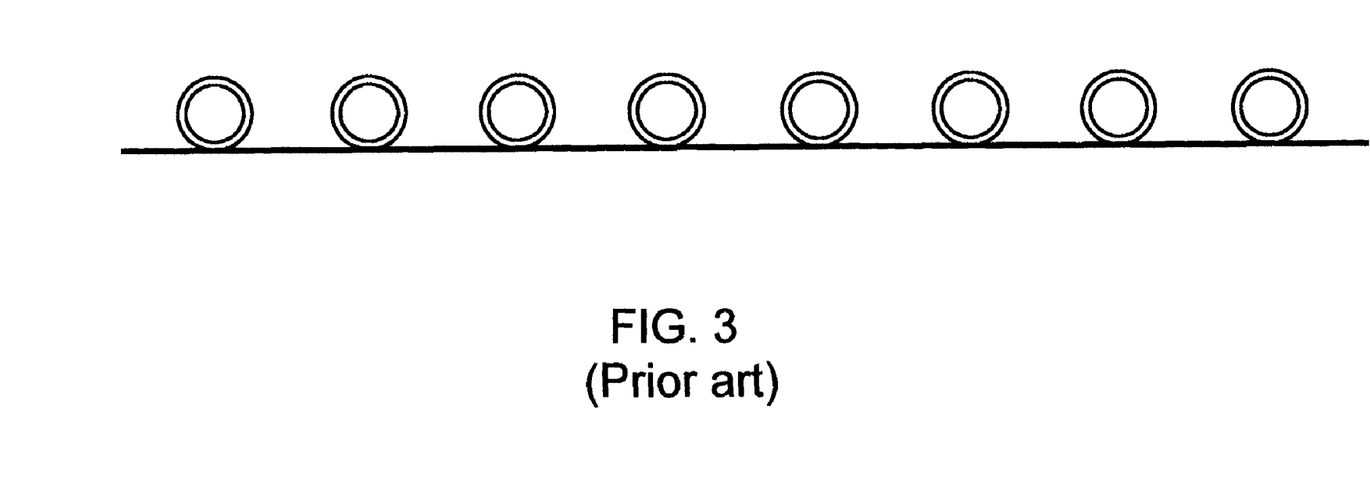
FIG. 3 schematically represents a cross-sectional view of a solar energy collection panel having round tubing in accordance with the prior art.

As represented in FIGS. 1 and 2, the tubes 12 are flat multiport tubes 12, also known as microchannel tubes, that replace the round copper tubing and multichannel polymeric tubing commonly found in solar collectors. Each tube 12 has a pair of oppositely-disposed flat surfaces 26a and 26b (of which the upper surfaces 26a are visible in FIG. 1) between lateral edges 28 of the tube 12 and longitudinal ends 30 of the tube 12. As shown in FIGS. 1 and 2, each tube 12 is formed to have multiple channels 24 through which a fluid (such as water) flows for the purpose of heating the fluid with absorbed solar radiation during the operation of the panel 10. In FIG. 2, adjacent channels 24 are separated by walls or webs 32 that interconnect the upper and lower flat surfaces 26a and 26b of the tubes 12. The tubes 12 are also represented in FIG. 2 as being further equipped with inner surface enhancements 34 to improve the heat transfer between the tubes 12 and a fluid flowing through their channels 24. The upper surfaces 26a of the tubes 12 serve as thermal absorbers that are sufficiently flat to eliminate the prior requirement for round polymeric and copper tubing to be bonded to a flat absorber plate or fins, as represented in FIG. 3. Absorber plates and fins are not required since the upper flat surface 26a of the tubes 12 effectively perform the function of an absorber plate. The upper flat surfaces 26a of the tubes 12 collect solar energy directly, and heat absorbed by the tube surfaces 26a is transferred directly through the walls of the tubes 12 to the fluid flowing through the channels 24 within the tubes 12, instead of by conduction from an additional and separate absorber plate or fin attached to the tube 12.

The tubes 12 and manifolds 14 are preferably formed of metallic materials, preferred examples of which are aluminum alloys that can be joined by brazing and, in comparison to polymeric (plastic) materials, have higher mechanical strength, are resistant to UV exposure, and capable of withstanding higher temperatures. As an alternative to aluminum, the tubes 12 can be manufactured from other metals, a non-limiting example being copper. The tubes 12 are preferably formed by an extrusion process, as known in the fabrication of extruded aluminum multiport tubes widely used in the automotive industry in condensers and charge air coolers. Alternatively, the tubes 12 can be formed by a cast and roll process, also employed in the fabrication of multiport tubes used in the automotive industry. The panel 10 can be fabricated with aluminum multiport tubes 12 to have a lower weight than that of a solar panel constructed of polymer or copper tubing and having an equivalent flow capacity. The tubes 12 can be fabricated to have essentially any number of parallel channels 24, and therefore more or less than the four channels 24 depicted in FIG. 1.

Though a very wide range of tube sizes can be employed, it is believed that a suitable size for the multiport tubes 12 will typically be about 12 by about 2 mm (width×thickness) to about 50 by about 7 mm, with or without the ability to track the sun. A suitable example is 16×2 mm extruded multiport tubes of a type commonly used in automotive condensers. A tube wall thickness of about one millimeter or less, for example, about 0.44 mm, is believed to be advantageous to promote heat transfer through the tube wall, and a tube thickness of about 2 mm is believed to be advantageous to maximize heat transfer from the tube wall to the fluid within the tube 12. The tubes 12 can be brazed to the manifolds 14 to construct panels 10 having a wide range of sizes, a nonlimiting example of which is about 2 by about 1 meter. Inlet and outlet ports and plugs can be brazed to the manifolds 14 as may be required.

Extruded aluminum multiport tubes have the advantage of being a relatively low-cost material in comparison to extruded polymeric tubing and copper tubing, as well as copper sheet material commonly used as absorber plates. Another advantage of extruded aluminum multiport tubes is their ability to be joined to the manifolds 14 using commercially available brazing materials, equipment, and methods. For example, braze rings can be installed on the ends 30 of the tubes 12 and the tubes 12 brazed to the manifolds 14 with the use of a braze torch. The brazing process can be automated, similar to what is done for automotive heat exchangers. Brazed aluminum multiport tubes have a proven track record in the automotive industry for high reliability and leak-free braze joints.

While the environmental resistance of extruded aluminum multiport tubes is well documented for applications in the automotive industry, longer service lives can be achieved by coating the interior surfaces (for example, the channels 24) and/or exterior surfaces (for example, the flat surfaces 26a and 26b) of the tubes 12. For example, zinc-coated aluminum tubes have been proven to resist high temperatures and external corrosion in harsh automotive applications. In addition or as an alternative, the tubes 12 can be coated with a corrosion treatment, for example, Inter-Kote®, to further extend the service life of the panel 10.

As noted above, the flat multiport tubes 12 employed by this invention are capable of higher heat transfer efficiency than an equivalent single round copper or polymer tubing, because the numerous small channels 24 within the multiport tubes 24 provide higher heat transfer efficiencies than round tubing (FIG. 3) currently used in the art. In pipe flow, a flow boundary layer is an essentially stagnant layer of fluid adjacent boundary walls containing the fluid. The maximum thickness of the boundary layer is physically limited by the radius of the pipe, and therefore the boundary layer capable of forming inside a large round tube is thicker than a boundary layer capable of forming in each small single channel 24 of the multiport tubes 12 of this invention. Because a boundary layer is stagnant, heat transfer occurs by conduction. In the purely laminar flow case, the heat transfer coefficient h is calculated as:

$$h=3.656\,k/D$$

where k is the coefficient of thermal conduction and D is the hydraulic diameter of the tube. It can be seen that as the diameter D decreases, h increases. In addition, the use of high thermal conductivity fluids will additionally increase h. Higher thermal conductivities (k) for the tube material also promote the heat transfer coefficient h, which provides an advantage for aluminum tubes over polymer tubes.

As evident from FIG. 2, the flat multiport tubes 12 employed by the invention also provide greater surface area, which further enhances heat transfer. Tube wall to fluid heat transfer $q_w$ can be defined as $$q_w = h \cdot A \cdot \Delta T$$

where h is the heat transfer coefficient, A is the surface area, and $\Delta T$ is the temperature differential between fluid and the tube wall. It can be seen that for the same temperature difference $\Delta T$ between the fluid and the tube wall, a larger surface area A and a higher h will both yield a higher heat transfer rate $q_w$. A single large tube has less surface area than multiple tubes with an equivalent cross-sectional flow area. This is true for contact with a fluid on the interior or exterior of the tubes. The invention utilizes multiport tubes 12 that are functionally equivalent to multiple round tubes. For example, while a typical round copper tube (FIG. 3) having a 13 mm outer diameter has approximately the same cross-sectional area as a typical extruded flat multiport tube (FIG. 2) having a width of about 66 mm and a thickness of about 2 mm, the flat multiport tube has about 3.3 times the surface area of the round tube per unit length. Consequently, the large exterior flat surfaces 26a of the multiport tubes 12 are highly suitable for collecting heat from the sun and transferring the heat to a fluid flowing within the channels 24 of the tube 12.

Figure 4:
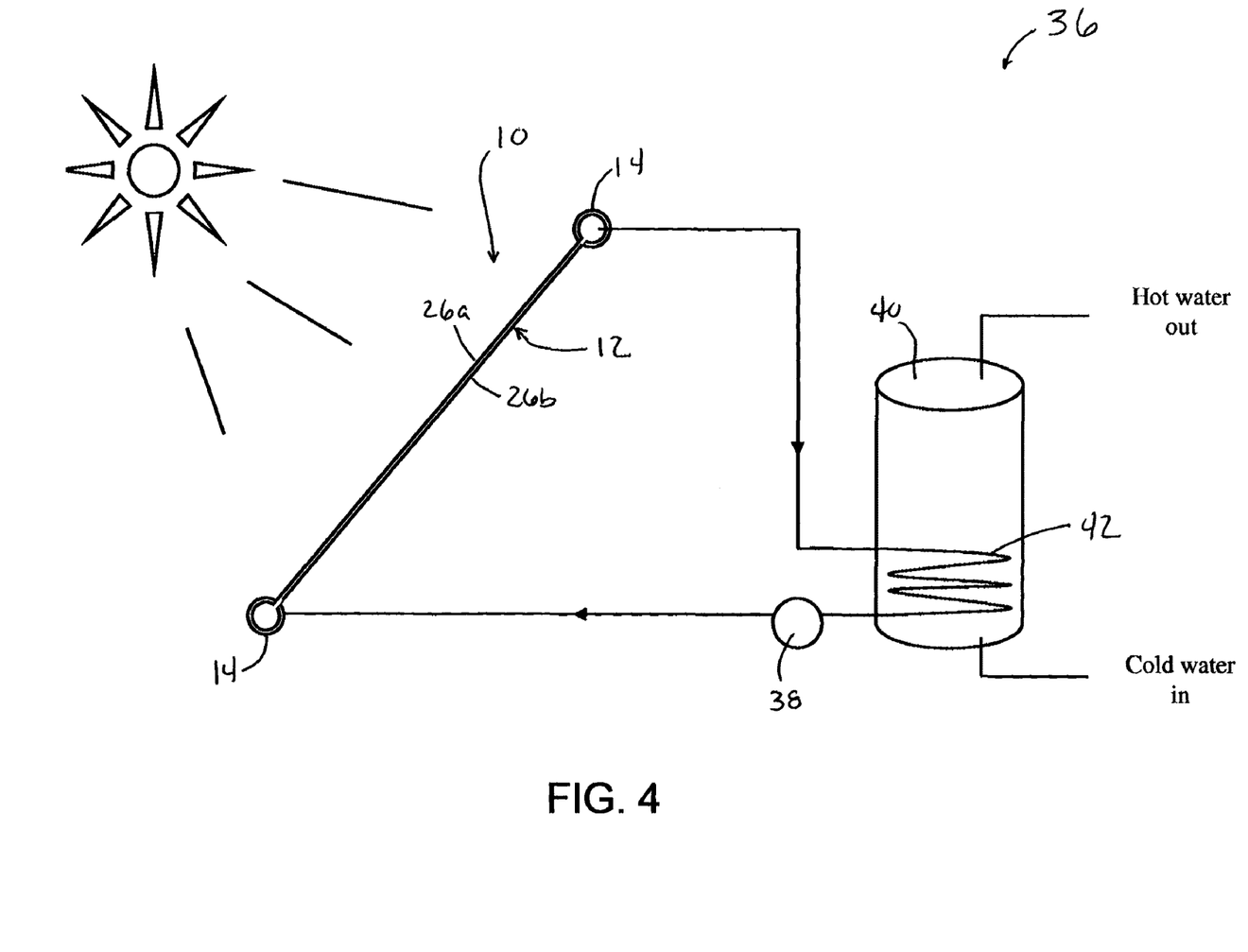
FIG. 4 schematically represents the solar energy collection panel of FIG. 1 installed in a solar energy collection system.

A solar water heating system 36 comprising the solar energy collection panel 10 of FIG. 1 is schematically represented in FIG. 4. The panel 10 is represented as being oriented so that solar radiation is incident at an angle normal to the upper flat surfaces 26a of the tubes 12, so that heating of the tubes 12 by absorption of solar radiation is maximized. With the aid of a pump 38 or other suitable pumping device, a fluid is pumped to the panel 10, enters one of the manifolds 14 and then flows through the channels 24 within the tubes 12, where the fluid absorbs the heat absorbed by the tubes 12. The fluid then exits the tubes 12 and enters the other manifold 14 before being returned to a tank 40 from which the fluid was withdrawn. The fluid used in this closed-loop system is preferably a mixture of water and propylene-glycol to prevent freezing in cold weather installation, though the use of other fluids is also foreseeable. After leaving the panel 10, the fluid is circulated through a heat exchanger 42 within the tank 40, thus transferring heat to a second fluid (for example, water) within the tank 40. The heated water can then be drawn from the tank 40 for any intended purpose, such as a residential, commercial and other setting where hot water is desired.

Figure 5:
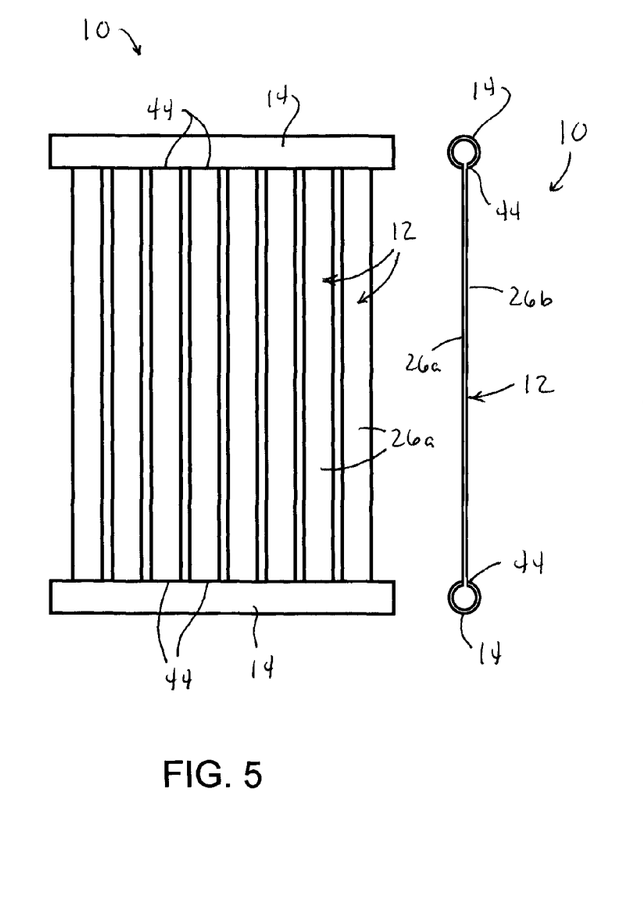
FIG. 5 schematically represents plan and side views of a solar energy collection panel similar to FIG. 1, wherein tubes of the collection panel are non-pivotably attached to inlet and outlet manifolds of the collection panel.
Figure 8:
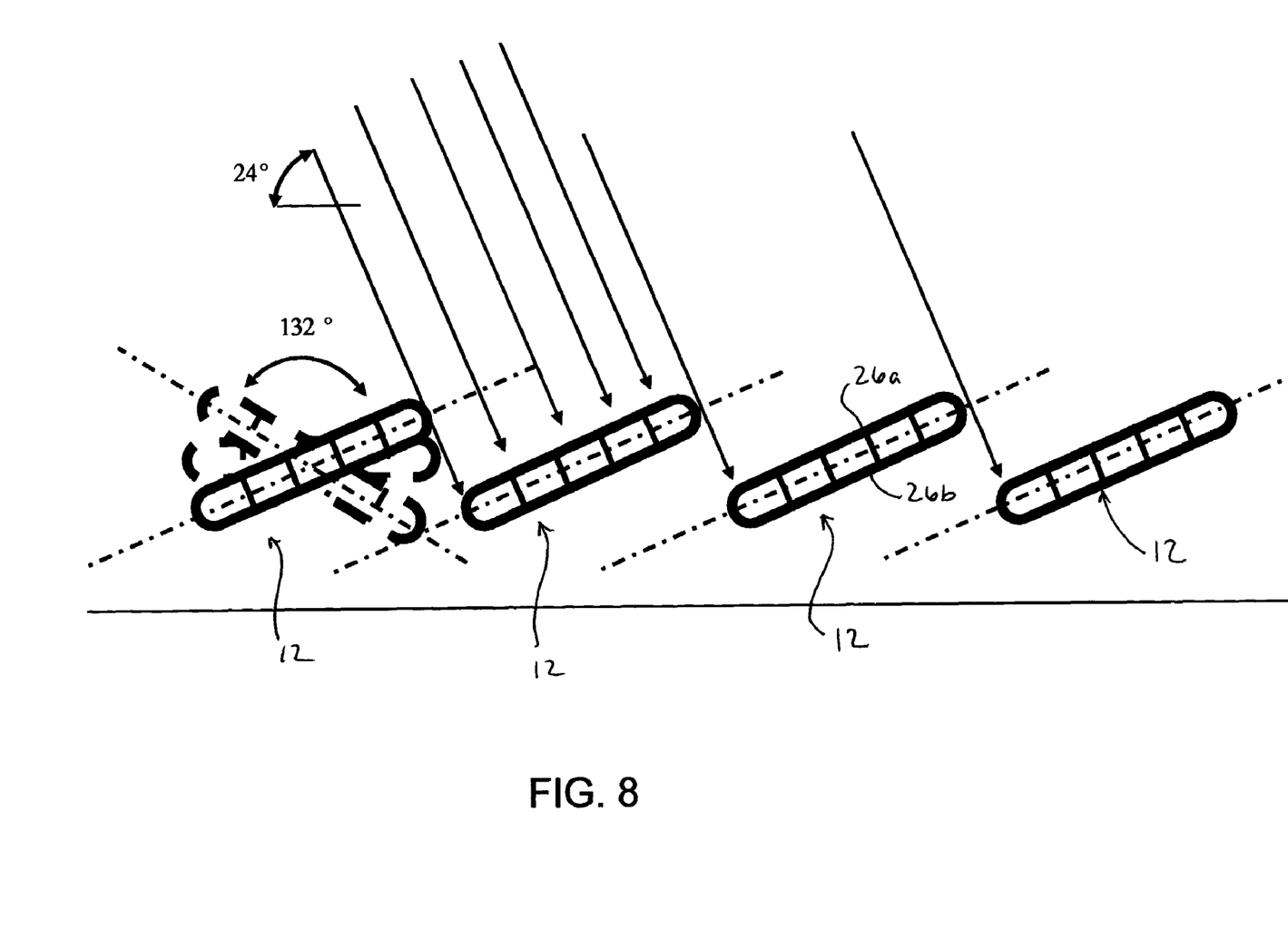
Figure 9:
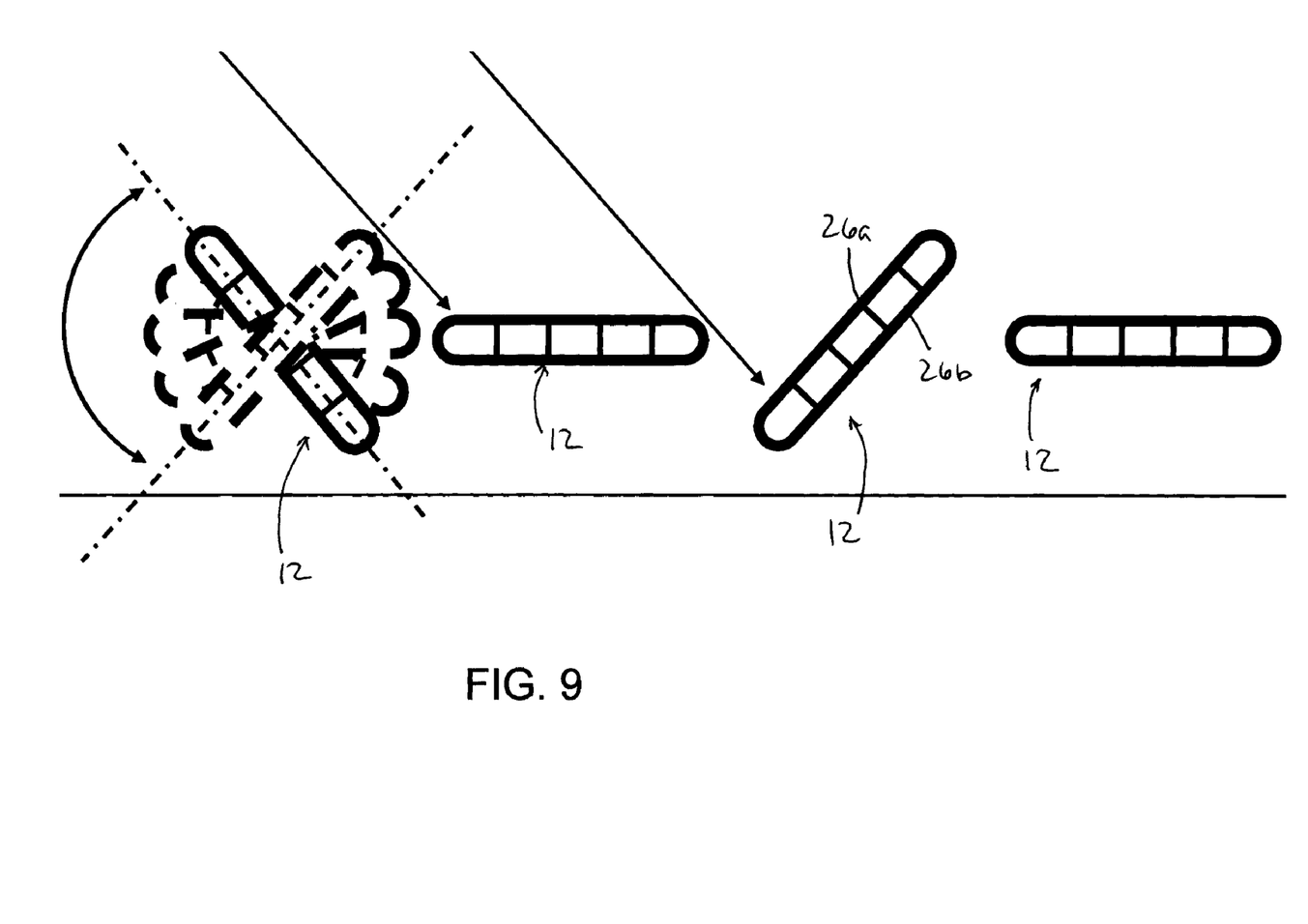
Figure 10:
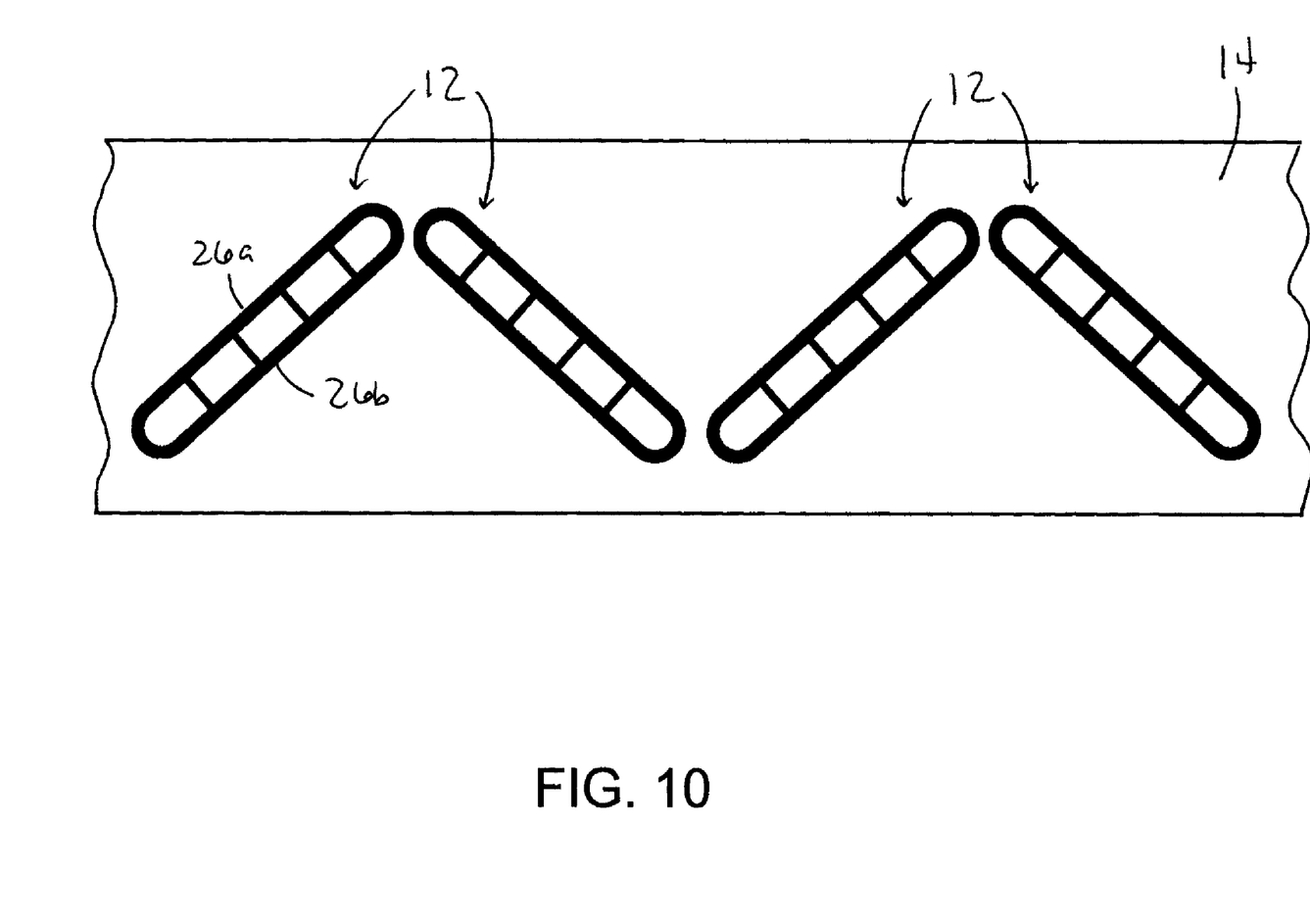
FIG. 10 schematically shows a cross-sectional view of multiport tubes of a solar energy collection panel similar to FIG. 1, in which the tubes are disposed at different angles to the sun.

FIGS. 5 through 10 represent several different construction methods that can be employed using the flat multiport tubes 12 of this invention to promote solar absorption efficiencies. In what will be termed a fixed construction, the tubes 12 are represented in FIG. 5 as fixed in a parallel arrangement between the manifolds 14. The tubes 12 are joined to the manifolds 14 by rigid brazements 44, and therefore are immobilized relative to the manifolds 14. Similar to what is shown in FIGS. 1 and 2, the tubes 12 are depicted in FIG. 5 as arranged so that their flat upper surfaces 26a are substantially coplanar, and maximum efficiency is achieved when the sun is at incident radiation (ninety degrees) to the panel 10. Alternatively, the tubes 12 can be arranged so that their upper flat surfaces 26a are not coplanar. As a nonlimiting example, FIG. 10 represents the tubes 12 as fixed (non-pivotable) to have their upper flat surfaces 26a oriented at an angle of about thirty degrees to about ninety degrees to each other and up to about forty-five degrees to the plane of the panel 10 (in which the tubes 12 and manifolds 14 lie), resulting in higher efficiency in the mornings and evenings and lower during midday when the sun radiation is greatest, with the potential for absorbing more overall/average heat than the coplanar fixed construction of FIGS. 1 and 5.

The fixed construction of the panel 10 described above can be produced by forming the slots 20 (FIG. 1) in the manifolds 14, inserting the tubes 12 into their respective slots 20, and then joining the tubes 12 and manifolds 14 by brazing. As previously noted, a particular example of the fixed construction is to complete the brazing in stages using a braze torch. A braze ring can be placed around one end 30 of each tube 12 prior to the tube end 30 being inserted into its respective slot 20 in one of the manifolds 14. Once all tubes 12 are in place with their respective braze rings, the assembly is fixtured and placed in front of a burner for an appropriate duration to melt the braze rings and braze the tubes 12 to the manifold 14. The assembly can then be removed, turned over, and the cycle repeated to braze the opposite ends 30 of the tubes 12 to the second manifold 14. Fittings and caps are then brazed at the ends of the manifolds 14 to yield the solar panel 10. An alternative manufacturing approach is to assemble all of the tubes 12 with the manifolds 14 and heat the entire assembly in an inert atmosphere furnace, commonly referred to as a controlled atmosphere brazing (CAB) process. This manufacturing approach is advantageous for high-volume production, but can compromise the hardness of the tubes 12 and manifolds 14 as a result of an annealing effect.

Figure 7:
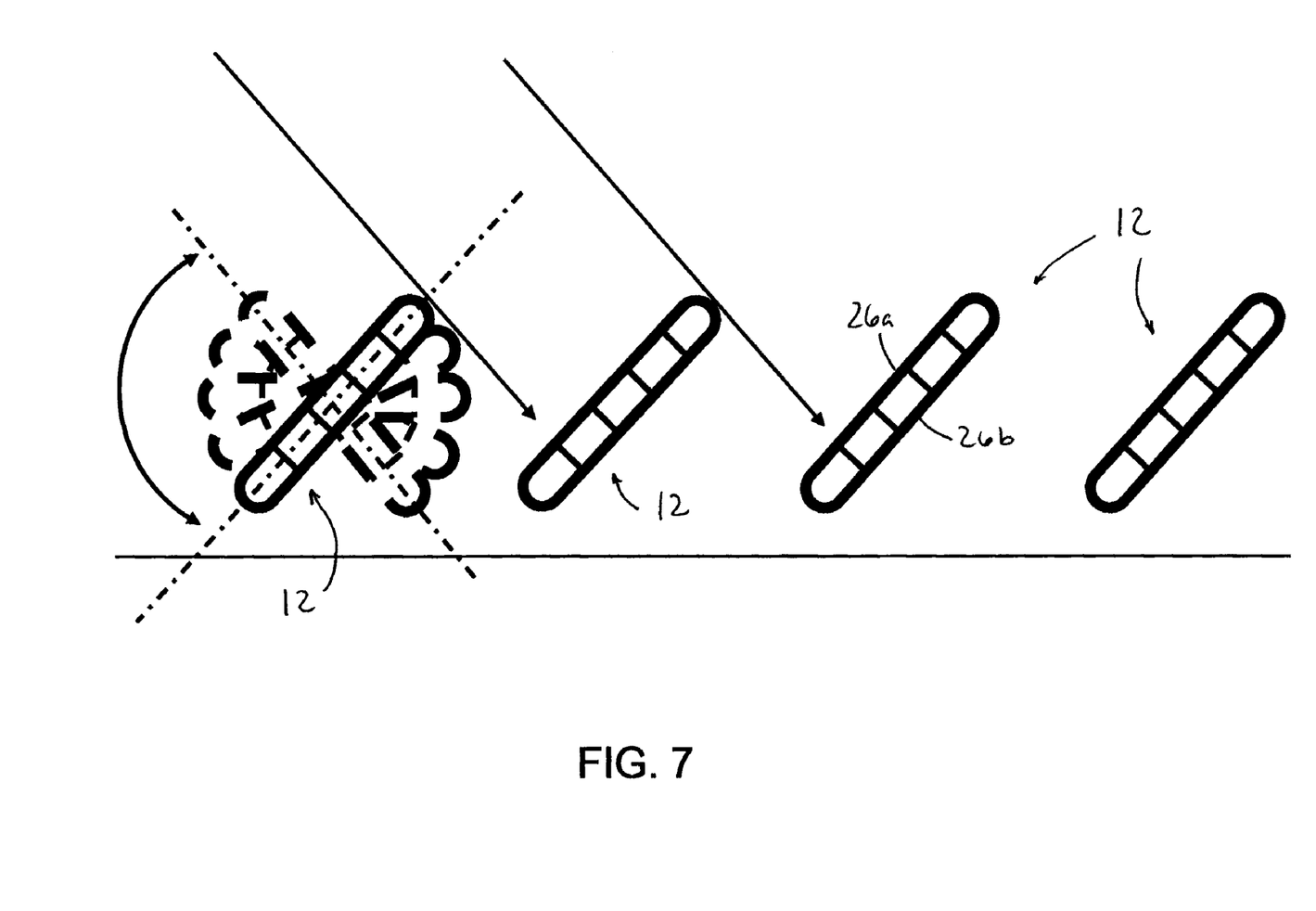
FIGS. 7, 8 and 9 schematically show cross-sectional views of multiport tubes of solar energy collection panels similar to FIG. 1, and represent the capability of pivoting some or all of the tubes for the purpose of tracking movement of the sun.

Another alternative depicted in FIGS. 6 through 9 is to couple some or all of the tubes 12 to the manifolds 14 to provide what will be termed a rotating construction, with at least some of the tubes 12 being able to pivot about their longitudinal axes while their upper flat surfaces 26a face the same direction, enabling the tubes 12 to follow the movement of the sun across the sky. As evident from FIGS. 7 and 8, this approach maximizes incident solar radiation impinging the upper flat surfaces 26a of the tubes 12. Alternatively, the tubes 12 may be assembled in what will be termed a mixed construction, with fixed tubes 12 located between rotating tubes 12. An example of this construction is shown in FIG. 9.

Figure 6:
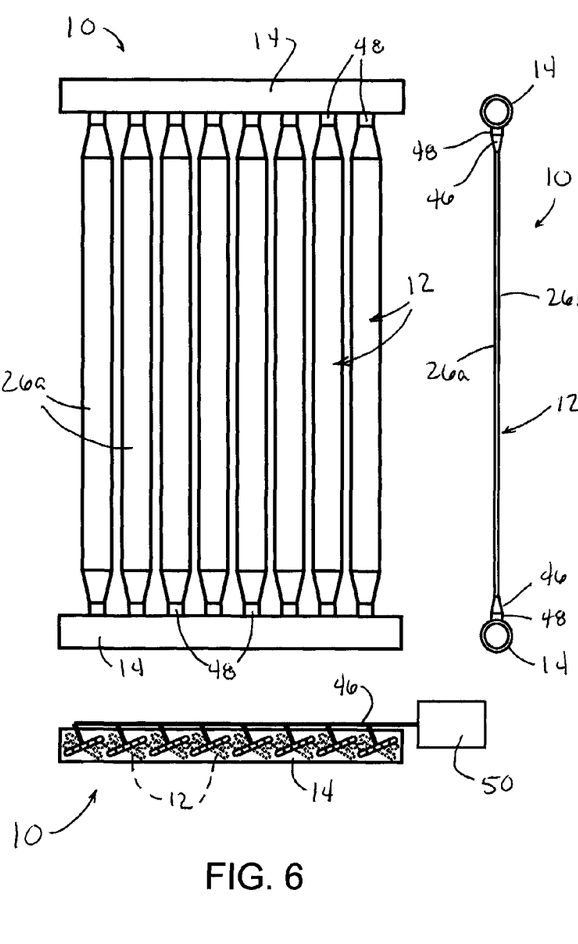
FIG. 6 schematically represents, plan, side and end views of a solar energy collection panel similar to FIG. 1, wherein tubes of the collection panel are pivotably attached to inlet and outlet manifolds of the collection panel.

For the pivoting tube embodiments of FIGS. 6 through 8, the tubes 12 can be connected to the manifolds 14 in various ways known in the art, for example, as simple as a water hose quick-connect employing an O-ring, or as elaborate as a coupling described in Canadian patent CA2073754A1, whose contents are incorporated herein by reference. As an example of a manufacturing process, FIG. 6 represents a swivel unit and arm 46 brazed to the ends 30 of each tube 12, and a receptacle 48 brazed in each corresponding opening 20 (FIG. 1) of the manifolds 14. The tubes 12 can then be pressed into their corresponding receptacles 48 to complete the construction shown in FIG. 6. The swivel units and arms 46 can be coupled to a pivoting drive mechanism 50, as a nonlimiting example, a simple screw-drive mechanism. When ambient light is above a preset level, the drive mechanism 50 operates at a fixed rate such that the swivel units and arms 46 (and therefore the tubes 12) follow the sun during daylight. When the ambient light is below a predetermined level, the drive mechanism 50 can be automatically returned to its initial "home" position and await sunrise.

Using the rotating construction of FIGS. 6, 7 and 8, the efficiency of the flat multiport tubes 12 is enhanced by enabling the tubes 12 to follow the movement of the sun across the sky. Utilizing this technique, the panel 10 is able to receive the maximum available solar radiation over most of the day, and not just during one moment of the day. As evident from FIG. 7, if the tubes 12 are placed close together such that a gap exists between adjacent tubes 12 only sufficient to avoid tube-to-tube contact, a shadowing effect can occur near sunrise and sunset. As shown in FIG. 8, reduced efficiencies caused by shadowing can be avoided if the rotations of the tubes 12 are limited to angles of about 24 to about 156 degrees (i.e., an included angle of about 132 degrees) to the plane of the panel 10, for example, about 24 to about 156 degrees from horizontal if the panel 10 is lying flat.

Solar panels 10 of this invention can be part of a new installation or can be a drop-in replacement for existing solar collectors. In either case, the completed solar panel 10 is preferably housed in an insulated casing, which includes the upper transparent panel 16 and lower panel 18 represented in FIG. 1. In most embodiments, the panels 16 and 18 are parts of an enclosure whose interior contains the solar panel 10. To minimize heat loss from the panel 10, the enclosure can be partially evacuated or filled with carbon dioxide or another gas having a lower coefficient of thermal conductivity than air. Furthermore, the enclosure may be insulated on all sides except the transparent panel 16 intended to face the sun.

What is believed to be a preferred embodiment is represented in FIGS. 11 through 14, which represent an enclosure 52 comprising the transparent upper panel 16, the lower panel 18, and a frame assembly 54 surrounding the panel 10. The construction of the lower panel 18 includes the aforementioned reflective surface 18a on an insulation sheet 18b. The reflective surface 18a may be defined by a reflective layer formed by depositing a reflective material on the insulation sheet 18b, though it should be understood that the reflective surface 18a could be defined by a separate sheet of reflective material that may be bonded or otherwise coupled to the insulation sheet 18b. The lower panel 18 is further represented as comprising an outer sheet 18c, which is primarily a structural member for purposes of assembling the enclosure 52. Those skilled in the art will appreciate that a wide variety of optically reflective materials, thermally insulative materials, and structural materials can be employed for the reflective surface 18a, insulation sheet 18b, and outer panel 18c, respectively, and the use of such known materials is within the scope of this invention.

The inclusion of the reflective surface 18a beneath the panel 10 is for the purpose of increasing performance as a result of allowing the sun's rays to penetrate the panel 10 through the gaps 56 (FIG. 12) between the tubes 12, and then reflecting the penetrated rays back toward the lower flat surfaces 26b of the tubes 12 with the reflective surface 18a. Without the reflective surface 18a, this energy would be lost as a result of being absorbed by the insulation sheet 18b. As evident from FIGS. 11 and 12, the reflective surface 18a is flat and intended to reflect incident solar radiation on the lower flat surfaces 26b of the tubes 12. As such, the reflective surface 18a differs from known concentrator panels that employ a convex reflector to concentrate and focus solar radiation over about 180 degrees of curved surface of a single tube.

Figure 13:
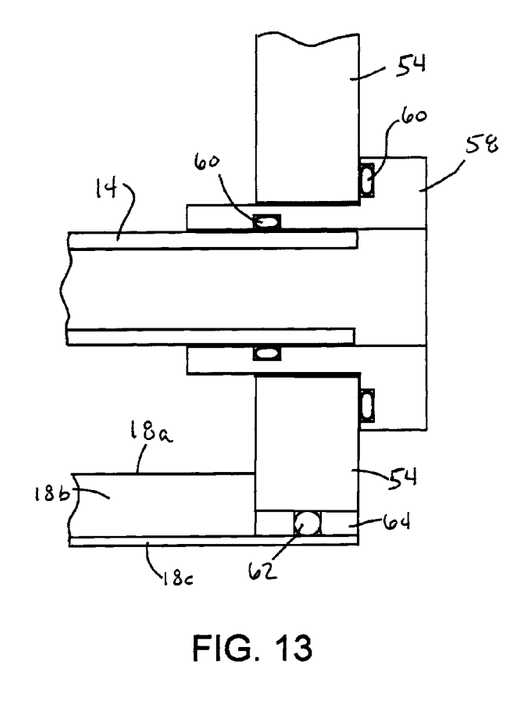
FIG. 13 is a cross-sectional view representing a coupling between a manifold of the collection panel and a frame member of the enclosure of FIGS. 11 and 12, and further representing an adhesive joint bonding a lower panel to the frame member.

As noted above, the enclosure 52 can either be purged with a low thermal conductivity gas like carbon dioxide or evacuated to some degree. Certain steps are preferably taken to achieve a suitably sealed enclosure 52 for the tube panel 10. FIG. 13 represents adaptors 58 by which the manifolds 14 can be located and held in place to the frame assembly 54. The adaptors 58 thermally insulate the manifolds 14 from the frame assembly 54, and thus reduce the tendency for the frame assembly 54 to act as a heat sink to the hot manifolds 14. The adaptors 58 are further equipped with elastomeric seals 60 that enable the adapters 58 to provide a hermetic sealing connection between the adapters 58 and the manifolds 14 and between the adapters 58 and the frame assembly 54.

Figure 11:
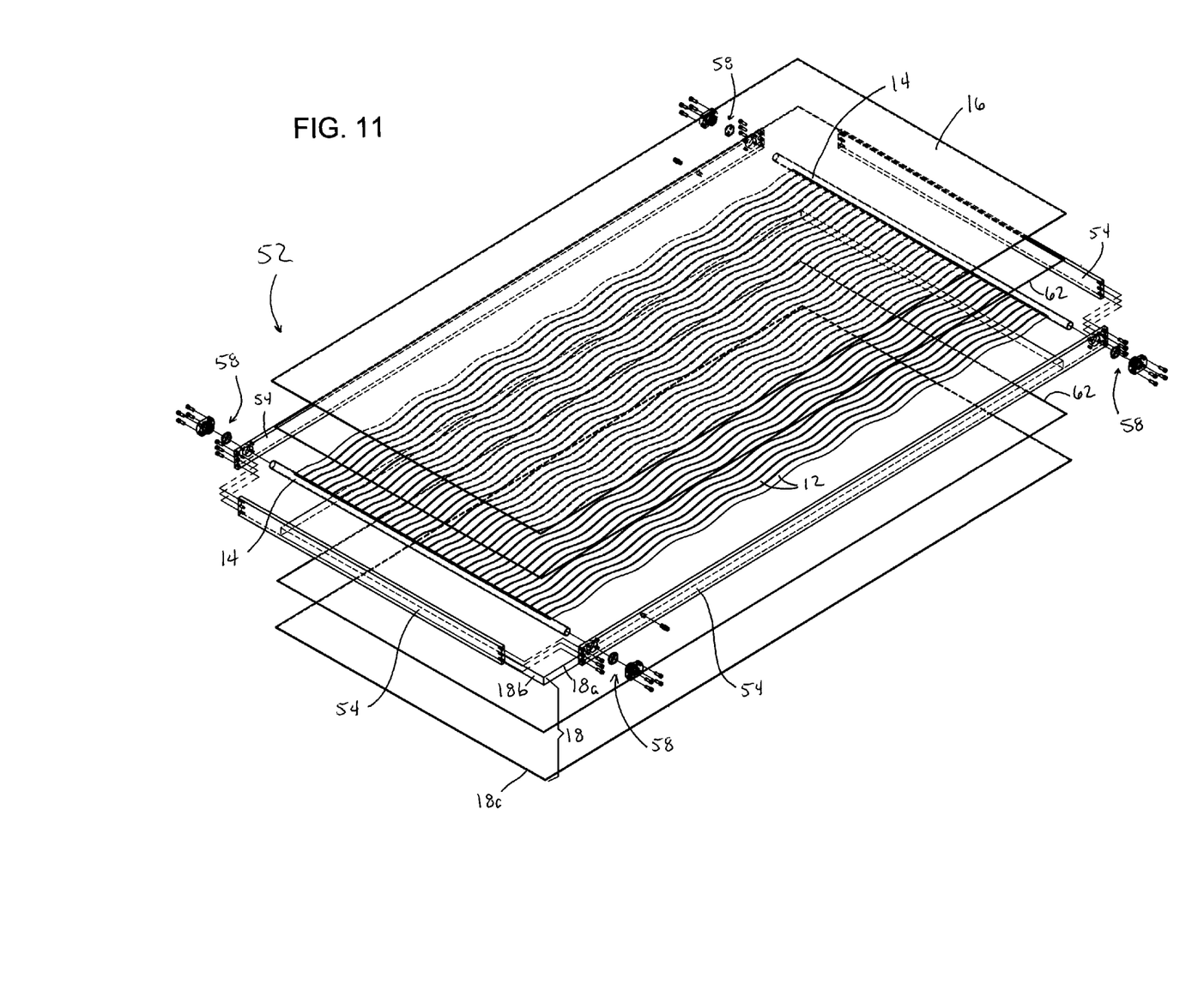
FIG. 11 is an exploded view representing a solar energy collection panel and an enclosure in accordance with a preferred embodiment of this invention.
Figure 14:
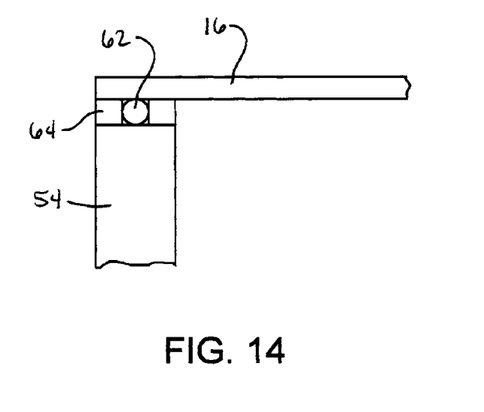
FIG. 14 is a cross-sectional view representing an adhesive joint bonding a transparent panel to a frame member of the enclosure of FIGS. 11 and 12.

Because the frame assembly 54, transparent panel 16 and lower panel 18 (comprising the reflective surface 18a, insulation sheet 18b and outer sheet 18c) are presumably formed of dissimilar materials with different coefficients of thermal expansion, some relative movement between these structures must be accommodated by the enclosure 52. In FIGS. 11, 13 and 14, a continuous elastomeric cord 62 is shown disposed between the adjacent edges of the frame assembly 54 and the outer sheet 18c of the lower panel 18 (FIG. 13) and between the adjacent edges of the transparent panel 16 and frame assembly 54 (FIG. 14) to serve as gaskets, and both elastomeric cords 62 are embedded in a flexible adhesive joint 64 that bonds the transparent panel 16 and outer sheet 18c to the frame assembly 54. In combination, the adhesive joints 64 and elastomeric cords 62 cooperate to form hermetic seals that also serve as buffers for thermal expansion. An example of a suitable adhesive material for the adhesive joints 64 is Heliobond PVA 205, which is known to be capable of joining aluminum and glass materials. For purposes of high-volume production, the elastomeric cords 62 can be positioned, the flexible adhesive can be dispensed, and the transparent panel 16 and lower panel 18 can be assembled to the frame assembly 54 with robotic arms and using known automation methods.

FIG. 11 further represents an additional preferred feature of the panel 10 that accommodates thermal expansion of the tubes 12. In the enclosure 52 represented in FIG. 11, the distance between the manifolds 14 is fixed by their attachment to the framing assembly 54. In practice, it is believed that expansion and contraction of the tubes 12 can be as much as five millimeters or more for tube lengths of about two meters. To allow for such thermal movement, the multiport tubes 12 are represented in FIG. 11 as having a corrugated or sinusoidal waveform along their longitudinal lengths. This waveform shape promotes the ability of the panel 10 to dissipate or absorb the linear movement of the tubes 12 by directing some of the thermal expansion out of the plane of the panel 10.

Figure 12:
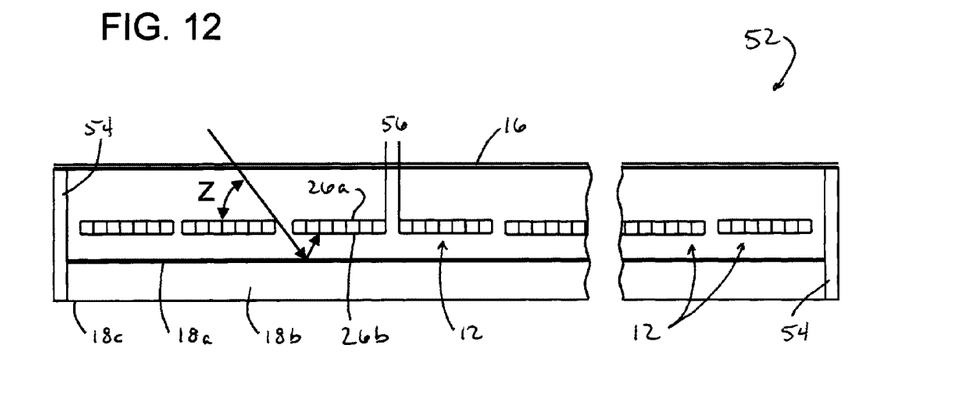
FIG. 12 is a cross-sectional view of the solar energy collection panel and enclosure of FIG. 11.

The enclosure 52 and its panel 10 represented in FIGS. 11 and 12 have been shown to increase efficiencies by more than 20% as compared to enclosures lacking the reflective surface 18a. In one investigation, a solar heating system was employed using a closed-loop circuit similar to that represented in FIG. 4 and comprising a pump, flow meter, fifty-gallon (about 189 liters) water tank, and a solar panel of this invention having a fixed (non-pivotable) tube construction with approximately 3 mm gaps between thirty-five tubes, each having cross-sectional dimensions of about 25.4×1.83 mm with a 0.44 mm wall thickness. The panel surface area (A) exposed to the sun was about 1.778 $m^2$, and the water mass flow rate (m) was about 0.208 kg/s. The specific heat (Cp) of water at 48° C. was taken as about 4178 j/kg-K. Incident radiation (R) was about 1045 $W/m^2$, and the measured temperature increase ($\Delta T$) in the water was about 1.35° C. Heat transfer (Q) to the water was then calculated by the equation $Q=m(Cp)(\Delta T)$ as 1173 W. Total incident solar energy was calculated to be about 1858 by multiplying the panel surface area (A) exposed to the sun (1.778 $m^2$) by the incident radiation (1045 $W/m^2$). The efficiency was then computed on the basis of the ratio of heat transferred to the water to the total incident solar energy, 1173/1858, or about 63%. A second test was then conducted using the same solar heating system, but with a reflective sheet beneath the panel and gaps of about 3 mm between the fixed tubes of the panel. The panel surface area (A) exposed to the sun was again about 1.778 $m^2$, while the gaps between the tubes provided a total surface area of about 0.222 $m^2$ for incident solar radiation on the reflective sheet and a total surface area exposed to the sun of about 2 $m^2$. Incident radiation (R) was about 967.9 $W/m^2$, and the measured temperature increase ($\Delta T$) in the water was about 1.9° C. Heat transfer (Q) to the water was then calculated by the equation $Q=m(Cp)(\Delta T)$ as about 1651 W. Total incident solar energy was calculated to be about 1936 by multiplying the total surface area (A) exposed to the sun (2 $m^2$) by the incident radiation (967.9 $W/m^2$). The efficiency was then computed on the basis of the ratio of heat transferred to the water to the total incident solar energy, 1651/1936, or about 85% and an increase of more than 20% above the efficiency of the previous solar panel.

While the system investigated above had tubes spaced apart by about 3 mm, it is foreseeable that the tube gap 56 could be varied, for example, for accommodating various sun azimuth conditions. As an example, gaps 56 can be advantageously varied over a range of about 2 to about 10 mm. The only limiting factor is the desired sun's angle of penetration (denoted as "z" in FIG. 12) to the reflective surface 18a and the lower flat surfaces 26b of the tubes 12. As the gaps 56 between the tubes 12 are increased, the sun is able to penetrate between the tubes 12 earlier and later in the day. However, increasing the gaps 56 between tubes 12 also increases the overall size of the panel 10 and its enclosure 52. A gap 56 of about 3 mm is believed to be an example of a suitable compromise between a compact enclosure 52 and the penetration angle z.

While the invention has been described in terms of specific embodiments, it is apparent that other forms could be adopted by one skilled in the art. For example, the tubes, solar panels, and solar water heating system could differ in appearance and construction from the embodiments shown in the Figures, and appropriate materials could be substituted for those noted. Therefore, the scope of the invention is to be limited only by the following claims.

The invention claimed is:

1. A solar energy collecting system comprising:
   a plurality of multiport tubes formed of a metallic material, each of the multiport tubes having oppositely-disposed first and second flat surfaces between lateral edges of the multiport tubes that define a width dimension of each of the multiport tubes, longitudinally-opposed first and second ends that define a length dimension of each of the multiport tubes, and a plurality of fluid channels between the first and second ends that are in fluidic parallel to each other, the multiport tubes being arranged to define at least first and second sets of multiport tubes, the multiport tubes of the first set being arranged to have the first flat surfaces thereof parallel to each other, the multiport tubes of the second set being arranged to have the first flat surfaces thereof parallel to each other, and the multiport tubes of the first and second sets being arranged relative to each other so that the first flat surfaces of the multiport tubes of the first set are not parallel to the first flat surfaces of the multiport tubes of the second set;
   an inlet manifold coupled to the first ends of the multiport tubes so that a chamber within the inlet manifold is fluidically connected to the fluid channels of the multiport tubes;
   an outlet manifold coupled to the second ends of the multiport tubes so that a chamber within the outlet manifold is fluidically connected to the fluid channels of the multiport tubes; and
   means for flowing a fluid from the chamber of the inlet manifold and through the fluid channels of the multiport tubes to the chamber of the outlet manifold.

2. The solar energy collecting system according to claim 1, further comprising an enclosure having an interior containing the multiport tubes and the inlet and outlet manifolds, the enclosure comprising first and second panels and a frame assembly interconnecting the first and second panels together such that the first and second panels are substantially parallel to each other, wherein the multiport tubes are oriented by the inlet and outlet manifolds so that their respective first flat surfaces is positionable to face the first panel and their respective second flat surfaces is positionable to face the second panel, the first panel being substantially transparent to solar radiation and the first flat surfaces of the multiport tubes being adjacent to the first panel so as to be heated by solar radiation that passes through the first panel into the interior of the enclosure, and the second panel comprising a reflective surface portion that is substantially reflective to solar radiation and the second flat surfaces of the multiport tubes being adjacent to the reflective surface portion so as to be heated by solar radiation that passes through the first panel into the interior of the enclosure and is reflected by the reflective surface portion.

3. The solar energy collecting system according to claim 2, wherein the enclosure is hermetically sealed and the interior thereof contains a gas that has a lower coefficient of thermal conductivity than air.

4. The solar energy collecting system according to claim 2, wherein the enclosure is hermetically sealed and the interior thereof is at least partially evacuated.

5. The solar energy collecting system according to claim 2, further comprising adapters for coupling the inlet and outlet manifolds to the frame assembly, the adapters comprising means for hermetically sealing the inlet and outlet manifolds to the frame assembly and thermally insulating the inlet and outlet manifolds from the frame assembly.

6. The solar energy collecting system according to claim 2, further comprising means for hermetically sealing the first and second panels to the frame assembly, the sealing means comprising an adhesive that bonds the first and second panels to the frame assembly and elastomeric seals between the frame assembly and the first and second panels and embedded in the adhesive.

7. A solar energy collection method using the solar energy collecting system according to claim 2, the method comprising pumping a fluid to the inlet manifold, flowing the fluid through the fluid channels within the multiport tubes of the first and second sets to absorb heat absorbed by the multiport tubes, and then flowing the fluid to the outlet manifold.

8. The solar energy collection method according to claim 7, wherein the fluid flowing through the fluid channels of the multiport tubes is heated by direct solar radiation impinging the first flat surfaces of the tubes and by reflected solar radiation impinging the second flat surfaces of the multiport tubes.

9. The solar energy collection method according to claim 7, further comprising the step of forming the multiport tubes by extruding the metallic material or by casting and rolling the metallic material.

10. The solar energy collection method according to claim 7, wherein the multiport tubes are formed to define a sinusoidal waveform between the first and second ends thereof, and the sinusoidal waveform is sufficient to accommodate thermal expansion of the multiport tubes between the inlet and outlet manifolds when the multiport tubes are heated by solar radiation.

11. The solar energy collection method according to claim 7, wherein the multiport tubes of the first set of the multiport tubes are pivotable multiport tubes that are pivotably coupled to the inlet and outlet manifolds, and the pivotable multiport tubes are pivoted relative to the multiport tubes of the second set to maintain the first flat surfaces of the multiport tubes of the first set normal to the direction of radiation incidence from the sun as the fluid flows through the solar energy collecting system.

12. The solar energy collection method according to claim 7, further comprising the step of assembling the multiport tubes of the first and second sets with the inlet and outlet manifolds to form an assembly and then heating the assembly in an inert atmosphere furnace to braze the multiport tubes of the first and second sets to the inlet and outlet manifolds.

13. The solar energy collecting system according to claim 1, wherein the metallic material of the multiport tubes is an aluminum or copper alloy.

14. The solar energy collecting system according to claim 1, wherein the multiport tubes are formed by extruding the metallic material or by casting and rolling the metallic material.

15. The solar energy collecting system according to claim 1, wherein the multiport tubes do not have any external fins or plates extending from the first and second flat surfaces or the lateral edges thereof.

16. The solar energy collecting system according to claim 1, wherein the multiport tubes define a sinusoidal waveform between the first and second ends thereof, the sinusoidal waveform being sufficient to accommodate thermal expansion of the multiport tubes between the inlet and outlet manifolds when the multiport tubes are heated by solar radiation.

17. The solar energy collecting system according to claim 1, wherein the multiport tubes of the first and second sets are non-pivotably coupled to the inlet and outlet manifolds.

18. The solar energy collecting system according to claim 17, wherein the first flat surfaces of the multiport tubes of the first set are at an angle of about thirty to about ninety degrees to the first flat surfaces of the multiport tubes of the second set.

19. The solar energy collecting system according to claim 18, wherein each of the multiport tubes of the first set is between a pair of the multiport tubes of the second set.

20. The solar energy collecting system according to claim 1, wherein the multiport tubes of at least the first set of the multiport tubes are pivotable multiport tubes that are pivotably coupled to the inlet and outlet manifolds to enable the multiport tubes of the first set to track the movement of the sun relative to the solar energy collecting system as the fluid flows therethrough.

21. The solar energy collecting system according to claim 20, further comprising means for pivoting the pivotable multiport tubes of the first set to maintain the first flat surfaces thereof normal to the direction of radiation incidence from the sun.

22. The solar energy collecting system according to claim 21, wherein the pivoting means is operable to pivot the pivotable multiport tubes of the first set between an angle of about 24 degrees to about 156 degrees to a plane containing the multiport tubes.

23. The solar energy collecting system according to claim 20, wherein each of the multiport tubes of the first set is between a pair of the multiport tubes of the second set.

24. The solar energy collecting system according to claim 20, wherein the multiport tubes of the second set are non-pivotably coupled to the inlet and outlet manifolds.

25. The solar energy collecting system according to claim 24, wherein each of the multiport tubes of the first set is between a pair of the multiport tubes of the second set.

26. The solar energy collecting system according to claim 1, wherein a gap exists between the lateral edges of each adjacent pair of the multiport tubes, and the multiport tubes are oriented by the inlet and outlet manifolds so that their first flat surfaces are directly heated by solar radiation and their second flat surfaces are heated by reflected solar radiation that passes through the gaps between the multiport tubes.

27. The solar energy collecting system according to claim 26, wherein the gaps have widths of about two to about ten millimeters.

28. A solar energy collection method using the solar energy collecting system according to claim 1, the method comprising pumping a fluid to the inlet manifold, flowing the fluid through the fluid channels within the multiport tubes of the first and second sets to absorb heat absorbed by the multiport tubes, and then flowing the fluid to the outlet manifold.

* * * * *